Feb. 5, 1952     H. E. MARVEL     2,584,394
FILTER

Filed Jan. 26, 1946     2 SHEETS—SHEET 1

HARVEY E. MARVEL
*INVENTOR.*

BY Edmund W. E. Kamm

Feb. 5, 1952  H. E. MARVEL  2,584,394
FILTER

Filed Jan. 26, 1946  2 SHEETS—SHEET 2

HARVEY E. MARVEL
INVENTOR.

BY Edmund W. E. Kamm

Patented Feb. 5, 1952

2,584,394

UNITED STATES PATENT OFFICE 2,584,394

FILTER

Harvey E. Marvel, Fort Wayne, Ind., assignor to Bowser, Inc., Fort Wayne, Ind., a corporation of Indiana Application January 26, 1946, Serial No. 643,565

1 Claim. (Cl. 210—184)

This invention relates to a filter having backwashing filter elements adapted to support a precoat of filter powder, more specifically, it relates to a filter having elements that are adapted to support a precoat to catch and retain foreign matter and which can be washed off the elements by reversing the flow of liquid through the elements.

It is an object of this invention to provide a filter having provisions to backwash the elements.

It is another object of this invention to provide a filter having elements that are easy and economical to replace.

It is still another object of this invention to provide an effective seal between the inlet and discharge sides of the elements.

It is yet another object of this invention to provide baffle means on the inlet side of the filter to distribute the flow of liquid evenly to the elements and without direct impingement.

It is still another object of this invention to provide a filter in which it is simple and easy to introduce a filter aid.

These and other objects will become apparent from a study of this specification and the drawings which are attached hereto and made a part hereof and in which.

Figure 1:
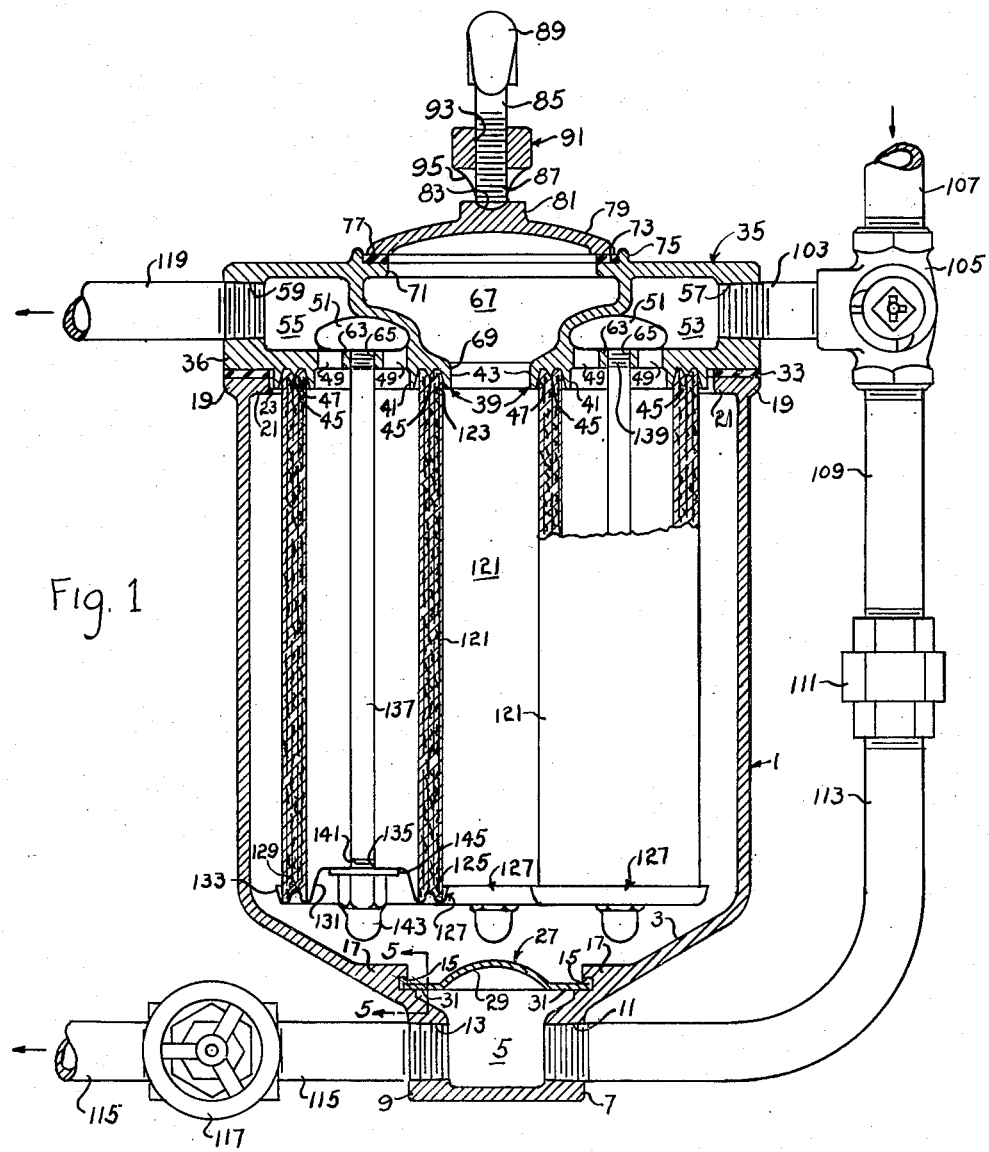
Figure 1 is a vertical section of the filter and piping, taken on line 1—1 of Figure 2, showing the filter elements, the powder feed mechanism and the backwashing means.
Figure 4:
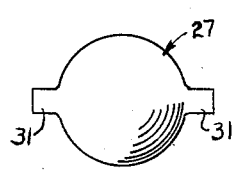
Figure 4 is a detail of the baffle as viewed from the top.
Figure 5:
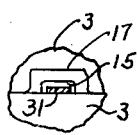
Figure 5 is a section taken on the line 5—5 of Figure 1, showing one of the projections on the baffle and the holding recess therefor.
Figure 2:
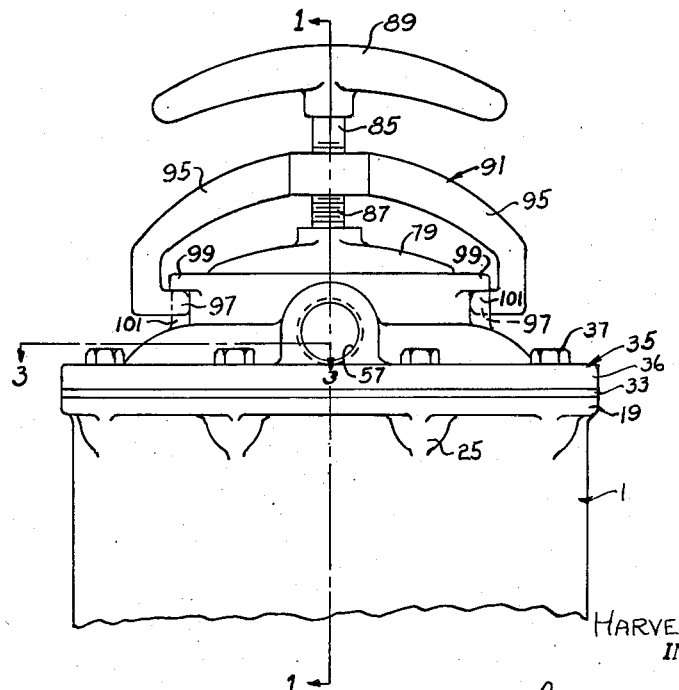
Figure 2 is an elevation taken from the inlet side, which is the right side as viewed in Figure 1, showing the top portion of the filter.

Referring now to Figure 1 of the drawings, the filter body 1 is substantially an open topped cylinder with cone bottom 3 terminating in a chamber 5 having bosses 7 and 9 which have tapped holes 11 and 13. Two diametrically opposed pockets 15 (Figure 5) are formed in projections 17 which extend in from the cone near the chamber 5. An external flange 19 and an internal flange 21 extend around the top of the body, the internal flange having an opening 23. Bosses 25 (Figure 2) are provided for tapped holes which receive cap screws 37.

A baffle 27 has a spherical cap portion 29 and two diametrically opposed tabs 31 which are formed to enter the pockets 15. The baffle is preformed with the tabs bent downwardly at an angle from the horizontal, in which position they will clear the upper edges of the pockets, but not the lower. The baffle is then pressed downwardly to bend the tabs into the horizontal position so that they will engage in pockets and will be held thereby.

A resilient gasket 33, circular in shape, is provided to seat on the top of flanges 19 and 21 of the filter body and to provide a seal between the body and a flange 36 around the periphery of the head 35 on its bottom side. Cap screws 37 fasten the head to the body and compress the gasket.

Equally spaced about the axis of the head are four sealing rings 39 which are formed in the bottom face of the head. The sealing rings are comprised of an inner ring 41 and an outer ring 43 with an annular V section 45 located midway between the inner and outer rings, forming an inwardly tapering circular channel 47 with the V rib in its middle facing downwardly. The appearance is similar to that of a capital M.

Semi-circular ports 49 are disposed between each sealing ring and its central axis and communicate with a circular passage 51. Ribs 61 and bosses 63 assist in defining the ports, and the bosses are provided with tapped holes 65, for the reception of tie rods, as will be explained. The passage 51 connects with passages 53 and 55, which communicate with the exterior by way of tapped holes 57 and 59.

A chamber 67 is formed centrally in the head 35 and has an outlet 69 at the bottom opening into the body 1 and a second opening 71 at the top which is circular in shape and has a radially directed flange 73 surrounded by an annular rim 75. A circular gasket 77 is received on the flange and provides a seal between it and the cap 79. The cap is crowned slightly and has a central, upwardly extending boss 81 projecting from the top. The boss has a spherical depression 83 which receives the rounded lower end of a clamping screw 85 which carries threads 87 on its lower end. The screw is provided with a handle 89.

A yoke 91 has a tapped hole 93 engaging the thread of the screw and has two diametrically opposed legs 95 extending outwardly and downwardly; and each leg is provided with a finger 97 extending inwardly and under projections 99 cast on opposite sides of the head. A stop 101 for the yoke is provided on the under side of each projection.

A nipple 103 enters tapped hole 57 and connects with a three-way valve 105 which is connected to an unfiltered water supply conduit 107. A conduit 109, a union 111, and a bent conduit 113 connect the valve with the tapped hole 11 at the bottom of the filter body.

Hollow, cylindrical filter elements 121 have their top ends 123 seated in the sealing rings 39 and their lower ends 125 seated in circular cup-like retainers 127 having a cross-section very similar to that of the sealing rings. An inner wall 131 of the retainer extends upward and inclines toward the center, an outer wall 133 extends upward and inclines away from the center, and a V-shaped projection 129 is disposed between the walls. A hole 135 in each of the retainers provides passage for a tie rod 137 which is threaded at both ends. The top threads 139 engage threads 65 in boss 63 and the lower threads 141 are engaged by acorn nuts 143. Washer 145 is inserted between the bottom of the retainer and the face of the acorn nut to provide added strength for the retainer.

The acorn nut is drawn up on threads 141 to force the V sections 45 and 129 into the ends of the elements 121, the side walls of the channel 47 and the walls 131 and 133 of the retainer press inwardly upon the element and assist in forming a seal. The cartridge is thus deformed somewhat on both ends in order to prevent leakage around it.

A waste conduit 115 and a gate valve 117 are connected to tapped hole 13 in boss 9, while the filtrate discharge conduit 119 is in communication with chamber 55 by way of hole 59.

The filter elements 121 may, of course, be of any suitable design so long as they will support a precoat of diatomaceous earth or other filter aid. I have found that a spirally wound tube made of phenolic resin impregnated paper which is baked after forming is very acceptable and holds a precoat very well. Further, such elements lend themselves very readily to the method of support in the tank as disclosed herein.

*Operation*

Figure 3:
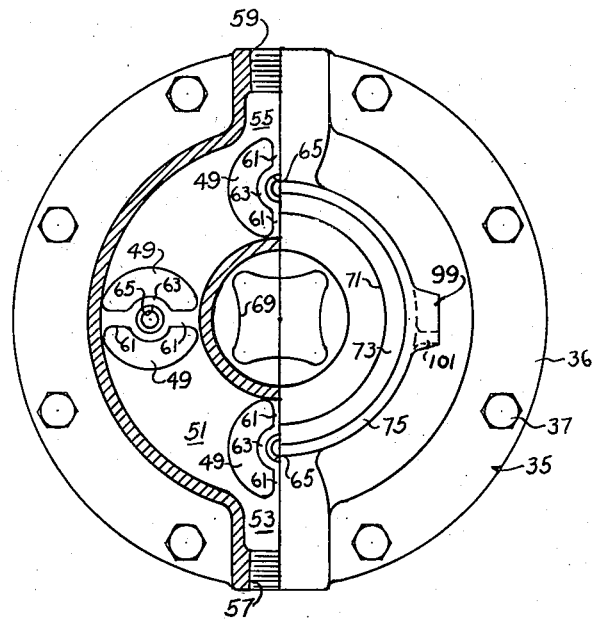
Figure 3 is a view, partly in plan and partly in section, of the filter head, the section having been taken substantially on the line 3—3 of Figure 2.

When starting the filter in operation, the cap 79 is removed after unscrewing the screw 85 sufficiently to loosen and permit removal of the yoke 91 by a slight counter-clockwise rotation (Figure 3). A measured quantity of filter aid is deposited into the chamber 67 and drops into the bowl 1, the bulk of the filter aid resting on the baffle 27. The filter is then filled with liquid, the water flowing from conduit 107 through the three-way valve 105, conduits 109 and 113 into chamber 5. Valve 117 and all valves on conduit 119 are closed. Conduit 119 is a service line. The liquid rises past the baffle, evacuating the air in the filter through the opening 71 in the head. When substantially all the air is evacuated, the cap 79 and the yoke 91 are replaced and tightened down on the gasket 77 by rotating handle 89 in a clockwise direction, the fingers 97 of the yoke 91 being, in this operation, drawn against the bottom of projections 99 on the head 35.

As liquid is drawn from the service line, the filter aid will be picked up by the incoming liquid and will be deposited on the outside surface of the elements 121 to form a precoat. The baffle 27 deflects the incoming liquid to prevent direct impingement of the stream on the elements to prevent the erosion of the filter aid from the elements. The liquid passes through the elements 121 and into passage 51 by way of ports 49. The liquid is discharged from passage 51 by way of chamber 55 and the service conduit 119, the flow being responsive to the opening and closing of the service valves.

After the precoat is established, the filtration is continued and the foreign matter in the liquid will be extracted by the filter aid in the usual manner until such time as the flow rate of the filtrate drops below a desired minimum. The elements 121 are then backwashed in the following manner: Close the service valves, open valve 117 and turn the three-way cock 105 to close conduit 109 and direct the flow of incoming liquid through nipple 103, chamber 55, passage 51, ports 49, and through the walls of the elements 121, thereby washing off the filter aid precoat and flushing it past the baffle 27 into chamber 5 and out through conduit 115 and valve 117 to a drain.

After backwashing the valve 105 is set to cut off the supply to both pipes 103 and 109 and the filter must be recharged with filter aid in the manner described above. The cycle will thus be repeated.

Since the device is used on drinking water and other services in which the water supply is already reasonably clean, no harm is done to the elements by backwashing them with raw water.

Should the filter elements become plugged or punctured, it is a simple matter to replace them. The union 111 and a second union (not shown) in the line 115 are broken, cap screws 37 are withdrawn, and the tank 1 is removed. Removal of the acorn nuts 143, washers 145 and retainers 131 permits the elements to be removed from the head. New elements are installed, and the filter is reassembled by performing the recited steps in the reverse order.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claim.

What I claim to be new and desire to protect by Letters Patent of the United States is:

In a filter, a case having an inlet and an outlet, filter elements in said case interposed between the inlet and the outlet in the path of liquid flowing therebetween, a number of projections disposed in circumferential spaced relation about said inlet and provided with radial openings and stop means below said openings, a baffle having a number of tabs projecting radially and downwardly from the periphery thereof and adapted to be positioned by said stop means to enter said openings, said tabs being of such length as to engage in the openings when brought into a horizontal plane by being forced against said stop means so as to prevent removal of the baffle, said baffle being supported transversely across said inlet by the projections and tabs.

HARVEY E. MARVEL.

REFERENCES CITED

The following references are of record in the file of this patent:

UNITED STATES PATENTS

| Number | Name | Date |
|---|---|---|
| 142,217 | Ellis | Aug. 26, 1873 |
| 420,136 | Willis | Jan. 28, 1890 |
| 515,700 | Wilkinson, Sr. | Feb. 27, 1894 |
| 547,923 | Isbell | Oct. 15, 1895 |
| 645,238 | Simpson | Mar. 13, 1900 |
| 654,043 | Ziegler | July 17, 1900 |
| 847,537 | Abbott | Mar. 19, 1907 |
| 870,631 | Kneuper | Nov. 12, 1907 |
| 1,439,706 | Kneuper | Dec. 26, 1922 |
| 1,798,164 | Kuhn et al. | Mar. 31, 1931 |
| 1,992,101 | Stuart | Feb. 19, 1935 |
| 2,079,475 | Williams et al. | May 4, 1937 |
| 2,196,821 | Arnold | Apr. 9, 1940 |
| 2,216,921 | Marvel | Oct. 8, 1940 |
| 2,272,583 | Reed | Feb. 10, 1942 |
| 2,294,330 | Clark | Aug. 25, 1942 |
| 2,301,430 | Malanowski | Nov. 10, 1942 |
| 2,333,890 | Russell | Nov. 9, 1943 |

FOREIGN PATENTS

| Number | Country | Date |
|---|---|---|
| 112,395 | Germany | May 14, 1899 |